US010771177B2

(12) United States Patent
Su (10) Patent No.: US 10,771,177 B2
(45) Date of Patent: Sep. 8, 2020

(54) METHOD FOR TRANSMITTING CLIENT SIGNAL IN OPTICAL TRANSPORT NETWORK, AND OPTICAL TRANSPORT DEVICE

(71) Applicant: Huawei Technologies Co., Ltd., Shenzhen (CN)

(72) Inventor: Wei Su, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/233,426

(22) Filed: Dec. 27, 2018

(65) Prior Publication Data

US 2019/0140759 A1  May 9, 2019

Related U.S. Application Data

(63) Continuation of application No. PCT/CN2017/090615, filed on Jun. 28, 2017.

(30) Foreign Application Priority Data

Jun. 30, 2016  (CN) .......................... 2016 1 0503838

(51) Int. Cl.
*H04J 3/16* (2006.01)
*H04J 3/14* (2006.01)
(Continued)

(52) U.S. Cl.
CPC .............. *H04J 3/1652* (2013.01); *H04J 3/14* (2013.01); *H04Q 11/04* (2013.01);
(Continued)

(58) Field of Classification Search
CPC ....... H04J 2203/0057; H04J 2203/0089; H04J 3/14; H04J 3/1652; H04Q 11/00; H04Q 11/04
See application file for complete search history.

(56) References Cited

U.S. PATENT DOCUMENTS 8,374,186 B2 * 2/2013 Dong .................... H04J 3/1652
370/395.51
8,462,816 B2 * 6/2013 Yin ....................... H04J 3/1652
370/464
(Continued)

FOREIGN PATENT DOCUMENTS

CN  101180841 A  5/2008
CN  102056031 A  5/2011
(Continued)

OTHER PUBLICATIONS

"Network node interface for the synchronous digital hierarchy (SDH)," Series G: Transmission Systems and Media, Digital Systems and Networks, ITU-T Recommendation G.707/Y.1322, pp. 1-8, International Telecommunication Union, Geneva, Switzerland (Jan. 2007).

*Primary Examiner* — Amritbir K Sandhu
(74) *Attorney, Agent, or Firm* — Leydig, Voit & Mayer, Ltd.

(57) ABSTRACT

A method for transmitting a client signal in an optical transport network includes: dividing a payload of an optical payload unit signal into m first-granularity tributary slots; dividing one of the m first-granularity tributary slots into n second-granularity tributary slots, where a rate of the first-granularity tributary slot is n times that of the second-granularity tributary slot, m is a positive integer, and n is a positive integer greater than 1; mapping a first client signal onto a payload in which one or more of the n second-granularity tributary slots are located; adding an overhead of the first-granularity tributary slot and an overhead of the second-granularity tributary slot for the optical payload unit signal, to generate an optical data unit signal; and sending the optical data unit signal.

16 Claims, 6 Drawing Sheets

(51) Int. Cl.
*H04Q 11/04* (2006.01)
*H04Q 11/00* (2006.01)

(52) U.S. Cl.
CPC ............ *H04J 2203/0057* (2013.01); *H04J 2203/0089* (2013.01); *H04Q 11/00* (2013.01)

(56) References Cited

U.S. PATENT DOCUMENTS

| | | | | |
|---|---|---|---|---|
| 8,594,140 | B2* | 11/2013 | Zhang | H04J 3/1652 370/537 |
| 8,824,888 | B2* | 9/2014 | Lin | H04J 3/12 370/389 |
| 8,886,040 | B2* | 11/2014 | Vissers | H04J 3/1658 398/58 |
| 9,008,511 | B2* | 4/2015 | Lin | H04Q 11/0066 398/57 |
| 9,407,372 | B2* | 8/2016 | Wu | H04Q 11/00 |
| 2006/0104309 | A1* | 5/2006 | Vissers | H04J 3/1658 370/474 |
| 2008/0310458 | A1 | 12/2008 | Rijpkema et al. | |
| 2010/0221005 | A1 | 9/2010 | Zhao | |
| 2012/0106956 | A1 | 5/2012 | Rao et al. | |
| 2012/0224858 | A1 | 9/2012 | Chen et al. | |
| 2014/0255028 | A1 | 9/2014 | Haas | |
| 2015/0125148 | A1* | 5/2015 | Odashima | H04J 3/0608 398/58 |
| 2015/0139650 | A1* | 5/2015 | Su | H04B 10/516 398/66 |
| 2017/0195077 | A1* | 7/2017 | Su | H04L 12/4633 |
| 2017/0257169 | A1* | 9/2017 | Kitamura | H04J 3/16 |
| 2017/0324472 | A1* | 11/2017 | Kitamura | H04J 3/16 |
| 2017/0324496 | A1* | 11/2017 | Yamada | H04J 3/0623 |
| 2018/0375604 | A1* | 12/2018 | Su | H04J 3/1664 |
| 2019/0140759 | A1* | 5/2019 | Su | H04J 3/1652 |

FOREIGN PATENT DOCUMENTS

| | | | |
|---|---|---|---|
| CN | 102893629 A | 1/2013 | |
| CN | 105429726 A | 3/2016 | |
| CN | 105451102 A | 3/2016 | |
| EP | 0833471 A1 | 4/1998 | |
| EP | 3177029 A1 * | 6/2017 | ......... H04Q 11/0003 |
| EP | 3177029 A1 | 6/2017 | |
| EP | 3188386 A1 | 7/2017 | |
| JP | 2010136380 A | 6/2010 | |
| JP | 2011176750 A | 9/2011 | |

* cited by examiner

| Column | 15 | 16 | 17 | 18 | 19 | 20 | ... | 25 | 26 | 27 | 28 | 26 | 27 | 28 | ... | 3824 | |
|---|---|---|---|---|---|---|---|---|---|---|---|---|---|---|---|---|---|
| Row 1 | OPU overhead | TS a1 | | | | | | | | | | | | | | TS a4 | TS e2 |
| Row 2 | | TS a2 | | | | | | | | | | | | | | TS a3 | |
| Row 3 | | TS a3 | | | | | | | | | | | | | | TS a2 | TS c2 |
| Row 4 | | TS a4 | | | | | | | | | | | | | | TS a1 | |

(table represents OPUk payload area as shown in FIG. 6)

| MFAS | MSI | Overhead distribution of corresponding level-1 tributary slot pointers |
|---|---|---|
| 2 | MSI [2] | Tributary slot 1 |
| 3 | MSI [3] | Tributary slot 2 |
| ... | ... | ... |
| a+1 | MSI [a+1] | Tributary slot a |

METHOD FOR TRANSMITTING CLIENT SIGNAL IN OPTICAL TRANSPORT NETWORK, AND OPTICAL TRANSPORT DEVICE

CROSS-REFERENCE TO RELATED APPLICATIONS

This application is a continuation of International Application No. PCT/CN2017/090615, filed on Jun. 28, 2017, which claims priority to Chinese Patent Application No. 201610503838.1, filed on Jun. 30, 2016. The disclosures of the aforementioned applications are hereby incorporated by reference in their entireties.

TECHNICAL FIELD

The present invention relates to the field of optical communications technologies, and in particular, to a method for transmitting a client signal in an optical transport network, and an optical transport device.

BACKGROUND

An Optical Transport Network (OTN) is a core technology of a transport network. The OTN has abundant Operation, Administration and Maintenance (OAM) capabilities, a powerful Tandem Connection Monitoring (TCM) capability, and an out-of-band Forward Error Correction (FEC) capability, and can flexibly schedule and manage large-capacity services.

Four Optical channel Transport Units (OTU) having fixed line rates: an OTU1, an OTU2, an OTU3, and an OTU4 are defined in an OTN standard system. Levels of the line rates of the four OTUs are 2.5 G, 10 G, 40 G, and 100 G, respectively. A unit is bit/s, namely, bits per second. The four OTUs respectively correspond to four Optical channel Data Units (ODU) having same rate levels as those of the OTUs: an ODU1, an ODU2, an ODU3, and an ODU4. During signal multiplexing, an ODU of a rate level may be multiplexed to any ODU having a higher order than the ODU, to increase a data transmission rate. That the ODU1 is multiplexed to the ODU2 is used as an example. A payload area of the ODU2 may be divided into four tributary slots (TS), and each tributary slot is used to carry a piece of ODU1 data.

With the emergence of a large quantity of emerging services such as 5G mobile services (5th generation mobile networks), video services of, for example, 4K (4000 pixels) and 8K (8000 pixels), and Virtual Reality (VR), these services have diverse traffic demands and have a relatively high real-time requirement on bandwidth. An existing fixed tributary slot cannot effectively meet the requirement. Further, with extensive penetration of a Software-Defined Network (SDN), a customization demand of a customer and a demand for direct intervention to control a transport network continuously increase. The transport network needs to be more intelligently driven. This is not merely limited to programmability of a control plane. A data plane also needs to be assigned with programmability. The existing fixed tributary slot limits this capability and cannot meet a customized transmission requirement of a client service.

SUMMARY

Embodiments of the present invention provide a method for transmitting a client signal in an optical transport network, and an optical transport network device, to resolve a problem of low optical fiber bandwidth utilization due to a fixed rate used by an OTU in the prior art.

According to the first aspect, a method for transmitting a client signal in an optical transport network is provided, where the method includes:

dividing a payload of an optical payload unit signal into m first-granularity tributary slots;

dividing one of the m first-granularity tributary slots into n second-granularity tributary slots, where a rate of the first-granularity tributary slot is n times that of the second-granularity tributary slot, m is a positive integer, and n is a positive integer greater than 1;

mapping a first client signal onto a payload in which one or more of the n second-granularity tributary slots are located; and adding an overhead of the first-granularity tributary slot and an overhead of the second-granularity tributary slot for the optical payload unit signal, to generate an optical data unit signal; and sending the optical data unit signal.

According to the foregoing steps, a tributary slot is flexibly divided on an OTN data plane based on a requirement, to meet a customized transmission requirement of a client service. A same bearer container carries services of different rates in a mixed manner, to improve bandwidth transmission efficiency.

With reference to the first aspect, in a first possible implementation of the first aspect, a value of n is determined based on at least one of a rate, a transmission distance, and a modulation format of the first client signal.

With reference to the first aspect, in a second possible implementation of the first aspect, m is an integer greater than 1, and the method further includes:

dividing another first-granularity tributary slot of the m first-granularity tributary slots into x third-granularity tributary slots, where the rate of the first-granularity tributary slot is x times that of the third-granularity tributary slot, and x is a positive integer greater than 1.

With reference to the second possible implementation of the first aspect, in a third possible implementation of the first aspect, the optical data unit signal further includes an overhead of the third-granularity tributary slot; the dividing another first-granularity tributary slot of the m first-granularity tributary slots into x third-granularity tributary slots includes: dividing the another first-granularity tributary slot of the m first-granularity tributary slots into the x third-granularity tributary slots based on at least one of a rate, a transmission distance, and a modulation format of a received second client signal; and the method further includes:

mapping the second client signal onto a payload in which one or more of the x third-granularity tributary slots are located.

With reference to the second possible implementation of the first aspect, in a fourth possible implementation of the first aspect, the method further includes: dividing one of the x third-granularity tributary slots into z fourth-granularity tributary slots based on at least one of a rate, a transmission distance, and a modulation format of a third service signal; and mapping the third service signal onto a payload in which one or more of the z fourth-granularity tributary slots are located, where z is a positive integer greater than 1, and the optical payload unit signal further includes an overhead of the fourth-granularity tributary slot.

With reference to any one of the first aspect, or the first to the fourth possible implementations of the first aspect, in a fifth possible implementation of the first aspect, the overhead of the first-granularity tributary slot is located in an optical payload unit signal overhead of the optical payload unit signal, and the overhead of the second-granularity tributary slot is located in a payload of the optical payload unit signal.

With reference to the first aspect, in a sixth possible implementation of the first aspect, the overhead of the first-granularity tributary slot is located in an MSI field of an overhead of the optical payload unit signal, and the overhead of the first-granularity tributary slot is used to identify each first-granularity tributary slot.

With reference to the sixth possible implementation of the first aspect, in a seventh possible implementation of the first aspect, the overhead of the first-granularity tributary slot further includes information used to indicate whether the first-granularity tributary slot is divided into tributary slots of another granularity.

With reference to the first aspect, in an eighth possible implementation of the first aspect, the method further includes:

mapping a fifth client signal onto one or more of other first-granularity tributary slots that are in the m first-granularity tributary slots and that are different from the first-granularity tributary slot that is divided into the n second-granularity tributary slots.

With reference to any one of the first aspect, or the first to the eighth possible implementations of the first aspect, in a ninth possible implementation of the first aspect, the dividing a payload area of an optical payload unit signal into m first-granularity tributary slots includes:

sequentially numbering all columns of columns 1 to 3808 in the payload area of the optical payload unit signal from 1 to m in a cyclic manner, where columns having same numbers belong to a same first-granularity tributary slot.

According to a second aspect, an embodiment of the present invention provides an optical transport network device, including:

a tributary slot division unit, configured to divide a payload of an optical payload unit signal into m first-granularity tributary slots, and divide one of the m first-granularity tributary slots into n second-granularity tributary slots, where a rate of the first-granularity tributary slot is n times that of the second-granularity tributary slot, m is a positive integer, and n is a positive integer greater than 1;

a signal mapping unit, configured to map a first client signal onto a payload in which one or more of the n second-granularity tributary slots are located, and add an overhead of the first-granularity tributary slot and an overhead of the second-granularity tributary slot for the optical payload unit signal, to generate an optical data unit signal; and a sending unit, configured to send the optical data unit signal.

With reference to the second aspect, in a first possible implementation of the second aspect, the tributary slot division unit is further configured to:

divide another first-granularity tributary slot of the m first-granularity tributary slots into x third-granularity tributary slots based on at least one of a rate, a transmission distance, and a modulation format of a received second client signal, where the rate of the first-granularity tributary slot is x times that of the third-granularity tributary slot, and x is a positive integer greater than 1.

With reference to the first possible implementation of the second aspect, in a second possible implementation of the second aspect, the signal mapping unit is further configured to:

map the second client signal onto a payload in which one or more of the x third-granularity tributary slots are located.

With reference to the second aspect, in a third possible implementation of the second aspect, the tributary slot division unit is further configured to: divide one of the x third-granularity tributary slots into z fourth-granularity tributary slots based on at least one of a rate, a transmission distance, and a modulation format of a third service signal; and the signal mapping unit is further configured to:

map the third service signal onto a payload in which one or more of the z fourth-granularity tributary slots are located, where z is a positive integer greater than 1, and the optical payload unit signal further includes an overhead of the fourth-granularity tributary slot.

According to a third aspect, an embodiment of the present invention provides an optical transport network device, including:

a memory, configured to store computer-executable program code; and a processor, coupled to the memory, where the program code includes an instruction, and when executed by the processor, the instruction allows the optical transport network device to perform the following operations:

dividing a payload of an optical payload unit signal into m first-granularity tributary slots;

dividing one of the m first-granularity tributary slots into n second-granularity tributary slots, where a rate of the first-granularity tributary slot is n times that of the second-granularity tributary slot, m is a positive integer, and n is a positive integer greater than 1;

mapping a first client signal onto a payload in which one or more of the n second-granularity tributary slots are located; and adding an overhead of the first-granularity tributary slot and an overhead of the second-granularity tributary slot for the optical payload unit signal, to generate an optical data unit signal; and sending the optical data unit signal.

According to embodiments of the present invention, after the payload of the optical payload unit signal is divided into the m first-granularity tributary slots, the one of the m first-granularity tributary slots is further divided into the n second-granularity tributary slots with smaller granularity, and the first client signal is mapped onto the one or more of the second-granularity tributary slots. Therefore, a tributary slot can be flexibly divided on an OTN data plane based on a requirement, to meet a customized transmission requirement of a client service. A same bearer container carries services of different rates in a mixed manner, to improve bandwidth transmission efficiency.

BRIEF DESCRIPTION OF DRAWINGS

To describe technical solutions in embodiments of the present invention more clearly, the following briefly describes the accompanying drawings. The accompanying drawings show merely some exemplary embodiments of the present invention, and a person of ordinary skill in the art may still derive other drawings from these accompanying drawings without creative efforts.

DESCRIPTION OF EMBODIMENTS

To make objectives, technical solutions, and advantages of embodiments of the present invention clearer, the following clearly describes technical solutions in embodiments of the present invention with reference to the accompanying drawings. The described embodiments are some exemplary embodiments of the present invention. All other embodiments obtained by a person of ordinary skill in the art based on the described embodiments of the present invention without creative efforts may fall within the protection scope of the present invention.

Figure 1:
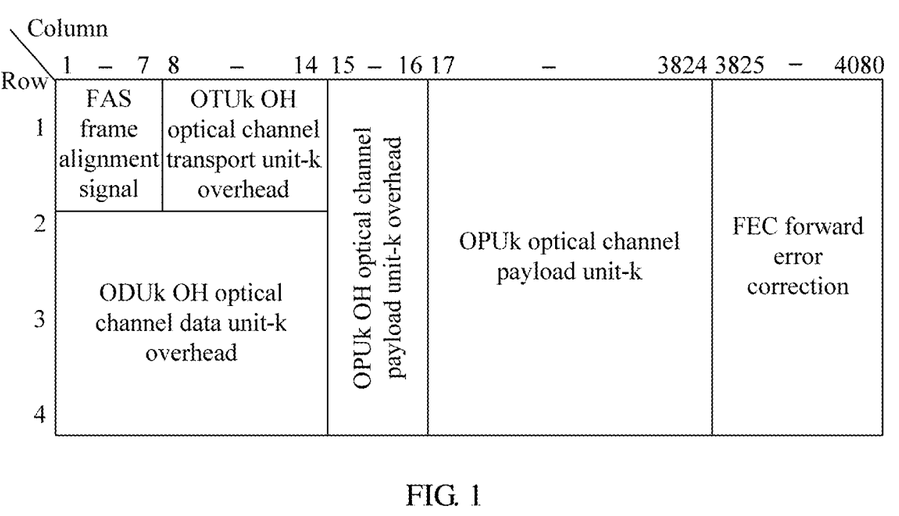
FIG. 1 is a diagram of an OTN frame format according to an embodiment of the present invention.

FIG. 1 is a diagram of an OTN frame format according to an embodiment of the present invention. As shown in FIG. 1, an OTN frame is a standard modular structure having 4080 columns and 4 rows. 16 columns in the header of the OTN frame are overhead bytes, 3808 columns in the middle of the OTN frame are a payload, and 256 columns in the tail of the OTN frame are FEC check bytes. The OTN frame includes: Frame Alignment Signal (FAS) bytes in row 1 and columns 1 to 7, used to provide a frame synchronization and positioning function, where a seventh byte of FAS is a multi-frame alignment signal (MFAS) used to indicate overhead allocation when a plurality of pieces of client service data are carried in a time division multiplexing manner; Optical Channel Transport Unit-k Overhead (OTUk OH) bytes in row 1 and columns 8 to 14, used to provide a network management function of an optical channel transport unit level; Optical Channel Data Unit-k Overhead (ODUk OH) bytes in rows 2 to 4 and columns 1 to 14, used to provide maintenance and operation functions; Optical Channel Payload Unit-k Overhead (OPUk OH) bytes in columns 15 and 16, used to provide a client service data adaptation function, where the OPUk OH bytes include a Payload Structure Identifier (PSI), the PSI corresponds to 0 to 255 possible values as instructed by the MFAS, the zeroth byte is a Payload Type (PT), and the other bytes are reserved (RES) bytes reserved for use during future expansion; OPUk bytes in columns 17 to 3824, used to provide a function of carrying client service data, where to-be-transmitted client service data is encapsulated into an OPUk; and FEC bytes in columns 3825 to 4080, used to provide error detection and error correction functions. The coefficient k represents a supported bit rate. Different bit rates correspond to different types of OPUks, ODUks, and OTUks. Herein, k=0 indicates that the bit rate is 1.25 Gbit/s; k=1 indicates that the bit rate is 2.5 Gbit/s; k=2 indicates that the bit rate is 10 Gbit/s; k=3 indicates that the bit rate is 40 Gbit/s; k=4 indicates that the bit rate is 100 Gbit/s. The OPUk and an OPUk OH form an OPUk frame; the OPUk frame, an ODUk OH, and an FAS form an ODUk frame; and the ODUk frame, an OTUk OH, and the FEC bytes form an OTUk frame.

Currently, for application of an OTN of more than 100 Gbit/s, the International Telecommunication Union-Telecommunication Standardization Sector (ITU-T) is formulating an Optical Channel Transport Unit-Cn (OTUCn) (C is a Roman numeral 100, and n is a positive integer) interface. The OTUCn interface provides an electrical interface processing capability having a rate of n*100 Gbit/s, and an OTUCn signal includes 20*n 5-Gbit/s tributary slots.

Figure 2:
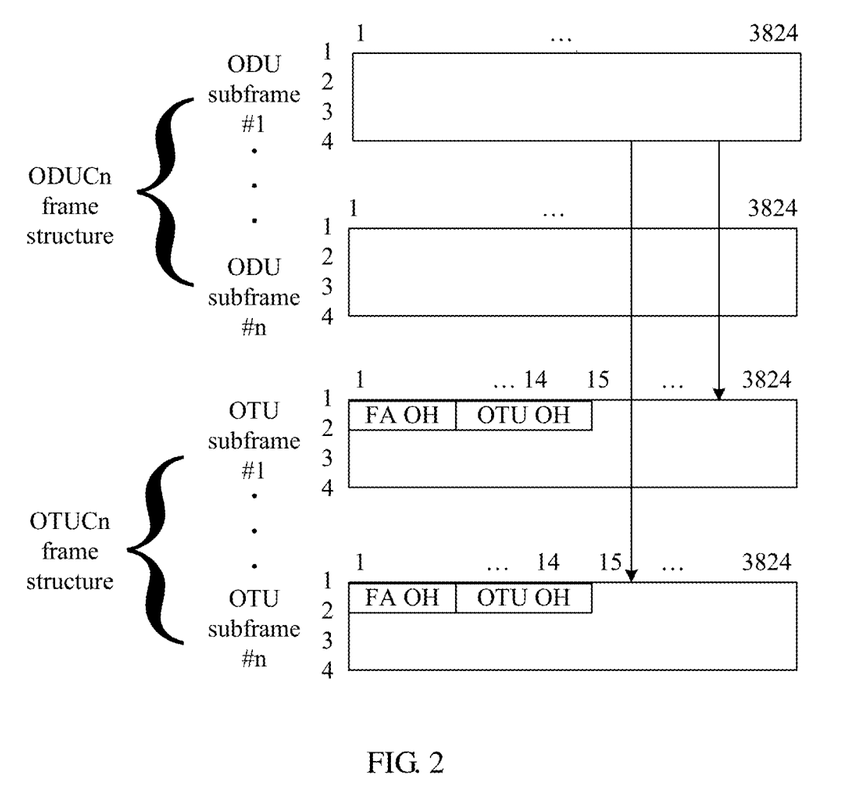
FIG. 2 shows a frame structure of an Optical Channel Transport Unit-Cn (OTUCn) frame defined for an OTUCn signal.

FIG. 2 shows a frame structure of an OTUCn frame defined for an OTUCn signal. The OTUCn frame includes n OTU subframes, and each OTU subframe includes 4 rows and 3824 columns. An Frame Alignment Overhead (FA OH) is frame positioning overhead bytes, and provides a frame synchronization and positioning function. An OTU OH is OTUCn overhead bytes. The OTUCn is managed and monitored as one signal, and a network management function of an optical channel transport unit level is provided. Most overhead information in an OTUCn overhead is carried by using an OTU OH of OTU subframe 1 (OTU subframe #1), and remaining overhead information is carried by using a plurality of other OTU subframes. The OTUCn frame is formed by adding an FA OH and an OTUCn overhead to an Optical Channel Data Unit-Cn (ODUCn) frame. The ODUCn frame includes n ODU subframes, and each ODU subframe includes 4 rows and 3824 columns. The ODUCn frame is formed by adding an ODUCn overhead to an Optical Channel Payload Unit-Cn (OPUCn) frame. The OPUCn frame includes n OPU subframes, and each OPU subframe includes 4 rows and 3810 columns. Each OPU subframe includes an overhead area of 2 columns and a payload area of 3808 columns. Each OPU subframe includes 20 5-Gbit/s tributary slots, used to carry lower-order services. Before the OTUCn frame is sent, single-byte or multi-byte interleaving processing, for example, single-byte or 16-byte interleaving processing, is performed on the n OTU subframes of the OTUCn frame based on a type of a physical interface that is to transmit the OTUCn frame, to form a serial OTUCn bit data stream. The serial OTUCn bit data stream is sent by using an optical module having a corresponding rate.

Figure 3:
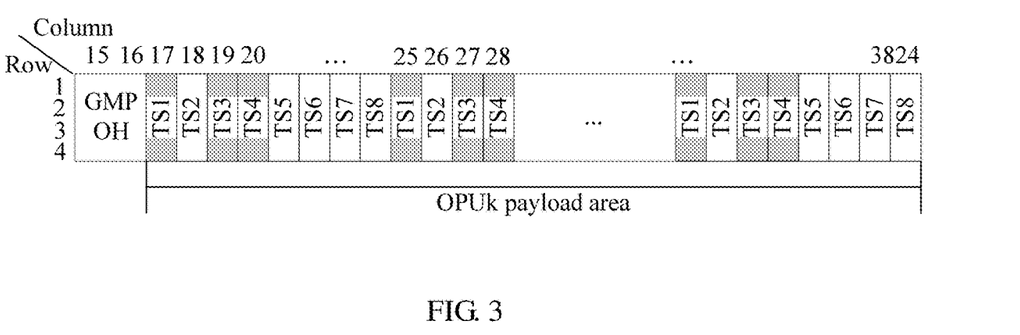
FIG. 3 is a schematic diagram of TS distribution using Generic Mapping Procedure (GMP) mapping according to an embodiment of the present invention.

A mapping procedure is a method for mapping different types of to-be-sent services onto an OPU payload area. For example, in this embodiment, a GMP mapping procedure is used to map client service data onto an OPU. FIG. 3 is a schematic diagram of TS distribution using GMP mapping according to an embodiment of the present invention. A GMP OH in FIG. 3 is equivalent to the OPUk OH in FIG. 1. The GMP OH in this embodiment includes TS information used to indicate TS adjustment. One or more TSs in FIG. 3 form a GMP block container, to transmit the client service data.

In FIG. 3, an exemplary GMP mapping method is described by using an OPU2. A payload area of an OPU2 frame is divided into 8 TSs. 4 rows in each column form a tributary slot. Tributary slots in all columns in the payload area of the OPU2 frame are sequentially identified as TS 1, TS 2, TS 3, . . . , and TS 8 in a cyclic manner. Eight OPU2 frames form one OPU2 8-multiframe. The client service data may be mapped onto one or more tributary slots in a payload area of the OPU2 8-multiframe. The one or more TSs in the OPU2 8-multiframe may form a GMP block container to carry the service data. Herein, three TSs: TS 1, TS 3, and TS 4, are used to transmit the service data.

The client service data is put into the GMP block container in a unit of a row. After corresponding tributary slots in a row are full, a similar putting operation is performed on corresponding tributary slots in a next row. As shown in FIG. 3, in this case, a quantity of TSs occupied by the GMP block container is three, and a mapping granularity is 3-byte (byte). When client service data is put into the GMP block container, 3 bytes of the client service data are respectively added to row 1 in columns 17, 19, and 20 within one clock cycle (determined by clock information during mapping), and then another 3 bytes of the client service data are respectively added to row 1 in columns 25, 27, and 28 within a second clock cycle. By analogy, after a row is full, a similar putting operation is performed in a next row.

A process of sending the client signal in an OTN is as follows: The client signal is multiplexed to an ODUk by using the GMP protocol. Forward error correction (FEC) data is added to the ODUk, to form an OTUk. Then, the OTUk is transmitted.

Specifically, before the client signal is multiplexed to the ODUk, a payload area of the ODUk is divided into n TSs.

Columns 17 to 3824 of the ODUk are the payload area, and the payload area of the ODUk includes a total of 3808 columns. A manner of dividing the payload area of the ODUk into the n tributary slots is as follows.

Figure 4:
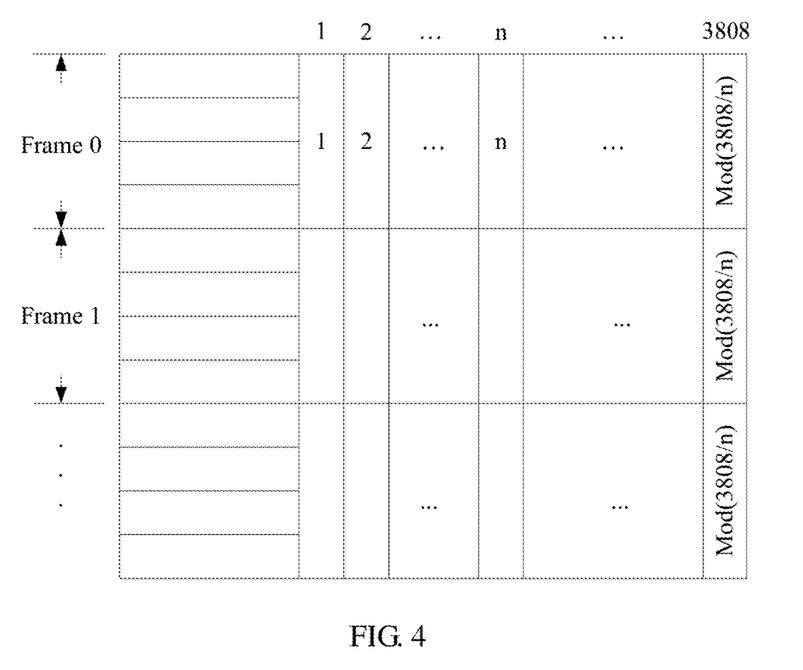
FIG. 4 is a schematic diagram of payload tributary slot division of an Optical Channel Payload Unit-k (OPUk) in an Optical Channel Data Unit-k Overhead (ODUk) according to an embodiment of the present invention.

As shown in FIG. 4, tributary slot division is performed on an OPUk payload in each ODUk frame. Columns 17 to 3824 of the ODUk, namely, columns 1 to 3808 in the payload area of the ODUk, are sequentially numbered from 1 to n in a cyclic manner. A number of the column 3808 in the payload area of the ODUk is Mod(3808/n), and Mod (3808/n) represents a remainder obtained by dividing 3808 by n. Columns having same numbers belong to a same tributary slot. Each tributary slot occupies int(3808/n) columns, and int(3808/n) represents rounding down 3808 divided by n. For example, when n is equal to 5, 3808/5 is equal to 761.6, Mod(3808/5) is equal to 3, and int(3808/5) is equal to 761. When 3808 is not divisible by n, bytes in columns corresponding to the remainder are filled. For example, when n is equal to 5, because 3808 is not divisible by 5, bytes in three remaining columns are filled. Because each tributary slot occupies int(3808/n) columns, and each column includes 4 bytes, each tributary slot occupies 4*int (3808/n) bytes.

Figure 5:
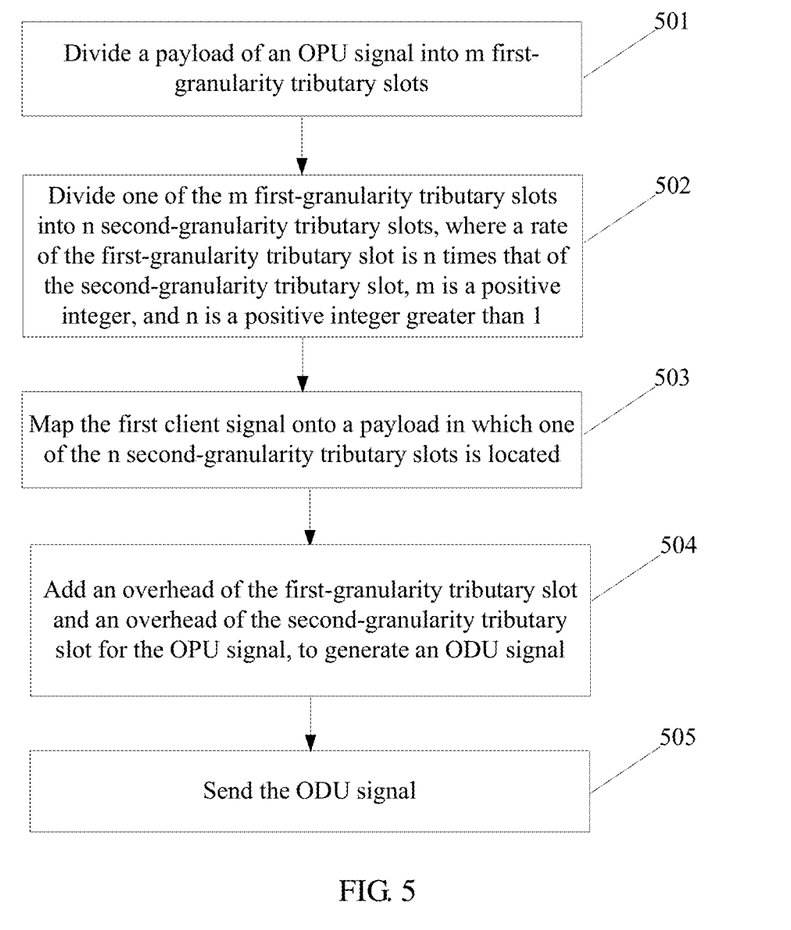
FIG. 5 is a schematic flowchart of a client signal transmission method according to an embodiment of the present invention.

Referring to FIG. 5, FIG. 5 is a schematic flowchart of a client signal transmission method according to an embodiment of the present invention. The method includes the following procedure.

Step S501: Divide a payload of an optical payload unit OPU signal into m first-granularity tributary slots.

The dividing, by an optical transport network device, a payload area of an OPU signal into m first-granularity tributary slots may include: sequentially numbering every M bytes in columns 1 to 3808 in the payload area of the OPU signal from 1 to m in a cyclic manner, where bytes having same numbers belong to a same first-granularity tributary slot, and M is a positive integer.

Alternatively, the dividing, by an optical transport network device, a payload area of an OPU signal into m first-granularity tributary slots may include: sequentially numbering columns 1 to 3808 in the payload area of the OPU signal from 1 to m in a cyclic manner, where columns having same numbers belong to a same first-granularity tributary slot.

The coefficient k in an ODUk represents a supported bit rate. Different bit rates correspond to different types of OPUks, ODUks, and OTUks. The OPUk and an OPUk OH form an OPUk frame; the OPUk frame, an ODUk OH, and an FAS form an ODUk frame; and the ODUk frame, an OTUk OH, and the FEC bytes form an OTUk frame. Herein, k=2 and m=4 are used as an example, where k=2 indicates that a bit rate of an ODU2 is 10 Gbit/s, and m=4 indicates that a payload of an OPU2 signal included in the ODU2 is divided into four first-granularity tributary slots, and a bit rate of each first-granularity tributary slot is 2.5 G.

Step S502: Divide one of the m first-granularity tributary slots into n second-granularity tributary slots, where a rate of the first-granularity tributary slot is n times that of the second-granularity tributary slot, m is a positive integer, and n is a positive integer greater than 1.

Figure 6:
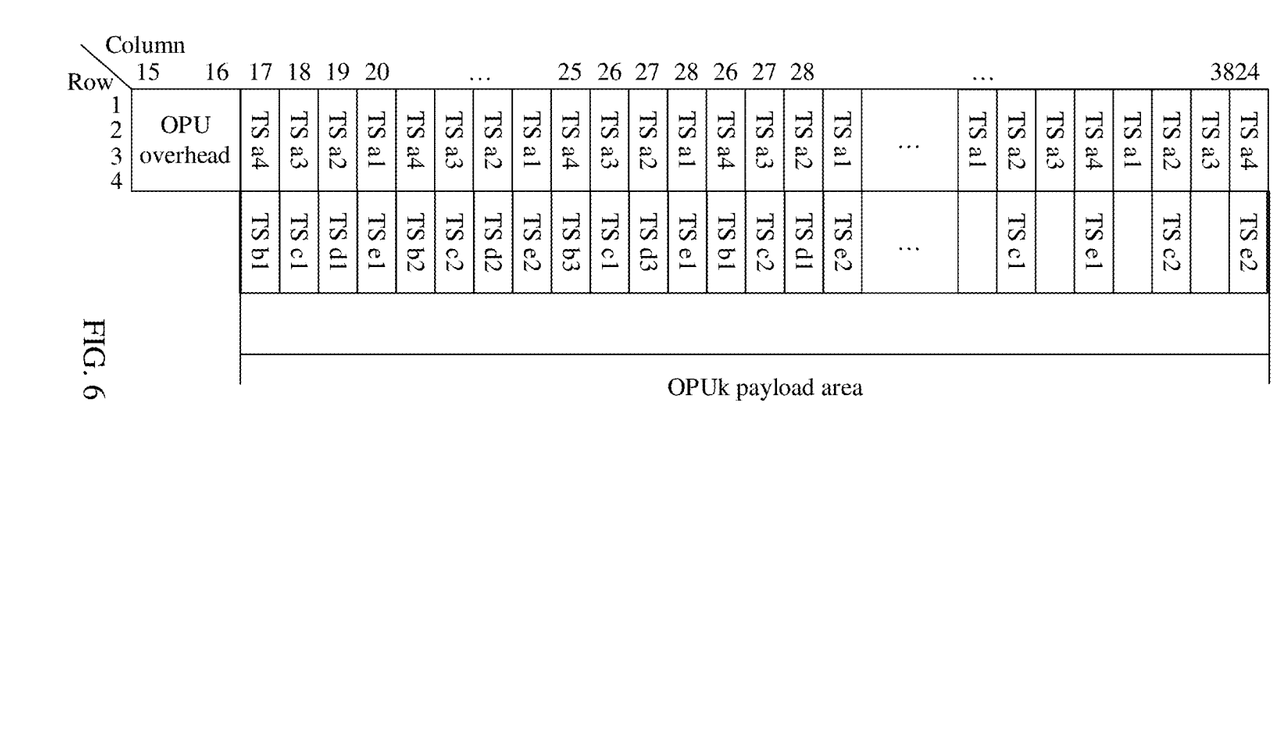
FIG. 6 is a schematic diagram of performing multi-granularity tributary slot division on a payload of an optical payload unit signal according to an embodiment of the present invention.

An existing ODUk, for example, an ODU2, has two fixed tributary slot granularities of 1.25 G and 2.5 G. These tributary slot granularities limit effective service carrying to an extent, and cannot provide optimal bandwidth transmission efficiency. In this embodiment of the present invention, as shown in FIG. 6, the optical transport network device may further divide a rate 2.5 G of a first-granularity tributary slot into rates of second-granularity tributary slots. The rate of the first-granularity tributary slot is n times that of the second-granularity tributary slot, and n is an integer greater than 1. For example, the rate of the second-granularity tributary slot obtained after division may be ½, ⅓, or ¼ of the rate 2.5 G. Herein, a ratio of the rate of the first-granularity tributary slot rate to the rate of the second-granularity tributary slot, namely, a value of n, may be determined based on a rate of a first client signal that needs to be carried. For example, when the rate of the first client signal is 0.8 G, and when the rate 2.5 G is divided into rates of three second-granularity tributary slots, the rate of the second-granularity tributary slot is 0.833 G. Therefore, a rate of one first-granularity tributary slot may be divided into rates 0.8833 G of three second-granularity tributary slots.

Step S503: Map a first client signal onto a payload in which one of the n second-granularity tributary slots is located.

That the rate of the first-granularity tributary slot is 2.5 G, the rate of the second-granularity tributary slot is 0.833 G, and the first client signal rate is 0.8 G is still used as an example. The optical transport network device may map the first client signal onto a payload in which one of the three second-granularity tributary slots is located. FIG. 6 is a schematic diagram of OPU2 payload tributary slot division. In FIG. 6, TS a1 to TS a4 are first-granularity tributary slots whose rate is 2.5 G. One first-granularity tributary slot TS a1 is divided into three second-granularity tributary slots TS b1, TS b2, and TS b3. A first client service signal whose rate is 0.8 G may be mapped onto a payload in which the tributary slot TS b1 is located.

Herein, the first client signal occupies a part or all of the first-granularity tributary slot that is divided into the n second-granularity tributary slots, and other unoccupied first-granularity tributary slots may be used to carry other client signals. For example, another client signal may be mapped onto one or more of other first-granularity tributary slots that are in the m first-granularity tributary slots and that are different from the first-granularity tributary slot that is divided into the n second-granularity tributary slots.

Step S504: Add an overhead of the first-granularity tributary slot and an overhead of the second-granularity tributary slot for the OPU signal, to generate an ODU signal.

The overhead of the first-granularity tributary slot is located in an OPU overhead of the ODU signal, and the overhead of the second-granularity tributary slot is located in a payload of the OPU signal. The overhead of the first-granularity tributary slot is used to identify each first-granularity tributary slot. The overhead of the first-granularity tributary slot may further include information used to indicate whether the first-granularity tributary slot is divided into tributary slots of another granularity. When the overhead of the first-granularity tributary slot indicates that the first-granularity tributary slot is divided into the tributary slots of the another granularity, the overhead of the first-granularity tributary slot further includes information indicating a quantity of the tributary slots of the another granularity into which the first-granularity tributary slot is divided. The overhead of the second-granularity tributary slot may be located in the first byte of each second-granularity tributary slot. Overhead distribution information of the second-granularity tributary slot may be stored in an MFAS field.

Step S505: Send the ODU signal.

Specifically, the sending, by the optical transport network device, the ODU signal may be implemented by adding an OTU overhead for the ODU signal to generate an OTU signal, and sending the OTU signal.

Figure 7:
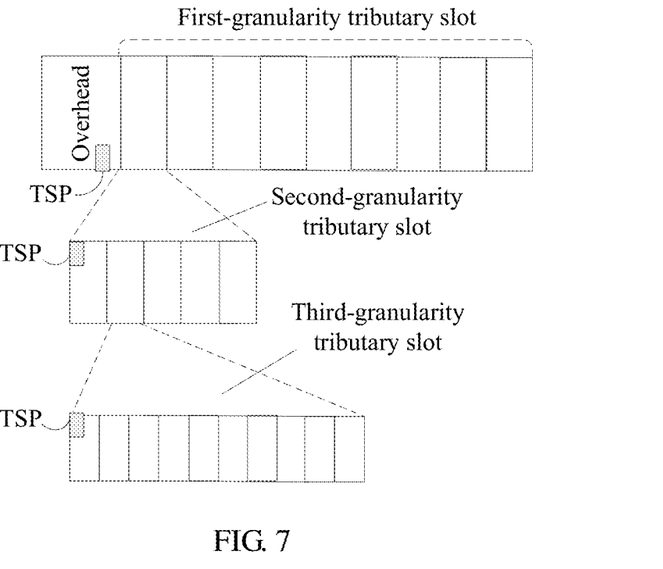
FIG. 7 is a structural diagram of an optical payload unit signal whose payload has undergone multi-granularity tributary slot division according to an embodiment of the present invention.

After the first-granularity tributary slot is divided into the second-granularity tributary slots, the second-granularity tributary slot may be further divided based on at least one of the following factors: a service rate, a transmission distance, and a modulation format, for example, a requirement of carrying a smaller service rate. For convenience, herein, the first-granularity tributary slot is referred to as a level-1 granularity tributary slot, the second-granularity tributary slot is referred to as a level-2 granularity tributary slot, and a tributary slot obtained after the second-granularity tributary slot is further divided is referred to as a level-3 granularity tributary slot. As shown in FIG. 7, one of the level-1 tributary slots is divided into level-2 tributary slots, and the level-2 tributary slot may be further divided into level-3 tributary slots. Assuming that the level-1 tributary slot is 2.5 G, the level-2 tributary slot may be 0.5 G, and the level-3 tributary slot may be 0.05 G. When the level-3 tributary slot is used to transmit a service, a service of as small as 0.1 G may be transmitted. Obviously, transmission using the level-3 tributary slot is more flexible and more resource-saving than that using the level-1 tributary slot. It can be learned from FIG. 8 that, an overhead of the level-1 tributary slot may be located in an overhead of an OPU, an overhead of the level-2 tributary slot may be located in the first byte of the level-2 tributary slot, and an overhead of the level-3 tributary slot may be located in the first byte of the level-3 tributary slot. The overhead of the level-1 tributary slot may include a Tributary Slot Pointer (TSP) of the level-1 tributary slot. The TSP of the level-1 tributary slot may be carried by using an Multiplex Structure Identifier (MSI) field of the OPU overhead. It is assumed that the payload of the OPU signal is divided into a level-1 tributary slots. An MFAS value is stored in a second MSI, namely, MSI [2], in the MSI field. Herein, the MFAS value is 2, which indicates that a tributary slot pointer of the first tributary slot in the level-1 tributary slots is stored in MSI [2]. An MFAS value stored in a third MSI, namely, MSI [3], in the MSI field is 3, which indicates that a tributary slot pointer of the second tributary slot in the level-1 tributary slots is stored in MSI [3]. By analogy, for example as shown in FIG. 8, a tributary slot pointer of the $(a)^{th}$ tributary slot in the level-1 tributary slots is stored in an $(a+1)^{th}$ MSI, namely, MSI [a+1], in the MSI field.

Figure 8:
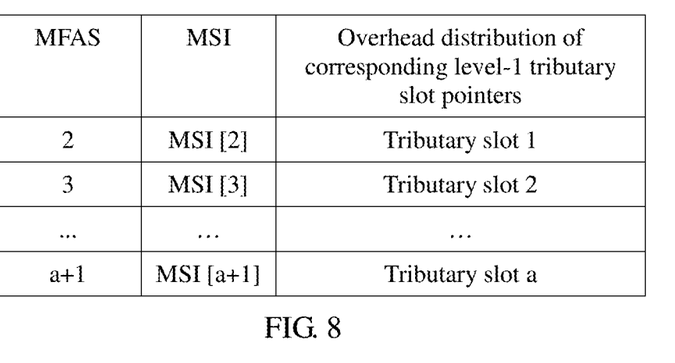
FIG. 8 is a schematic diagram of a value of an overhead of a tributary slot according to an embodiment of the present invention.

As shown in FIG. 8, for a tributary slot pointer of the level-2 tributary slot, an MFAS value of a level-2 tributary slot i may be set to 0 to indicate that the tributary slot pointer of the level-2 tributary slot is stored in the first byte of the level-2 tributary slot i. Likewise, for a tributary slot pointer of the level-3 tributary slot, an MFAS value of a level-3 tributary slot i may be set to 1 to indicate that the tributary slot pointer of the level-3 tributary slot is stored in the first byte of the level-3 tributary slot i. By analogy, for a tributary slot pointer of a level-N tributary slot, an MFAS value of a level-N tributary slot i may be set to N−2 to indicate that the tributary slot pointer of the level-N tributary slot is stored in the first byte of the level-N tributary slot i.

Figure 9:
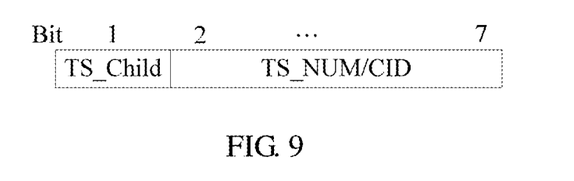
FIG. 9 is a schematic structural diagram of a field of a tributary slot pointer according to an embodiment of the present invention.

Content of the tributary slot pointer includes two fields, as shown in FIG. 9, which may be as follows:

(1) TS_Child: 1 bit, used to indicate whether a tributary slot of another granularity is nested in a current tributary slot. If TS_Child is 0, it indicates that a next-level tributary slot is not nested in the current tributary slot. If TS_Child is 1, it indicates that the tributary slot of the another granularity is nested in the current tributary slot.

(2) TS_NUM/CID: 7 bits. This field has two meanings: When TS_Child=0, this field is used to store client service information carried in a current tributary slot, such as a client service Identifier (ID) value, namely, a Client Service Identifier (CID). When TS_Child=1, this field is used to store a quantity of tributary slots of another granularity that are nested in the current tributary slot, namely, Tributary Slot Number (TS_NUM).

Herein, whether a tributary slot of another granularity is nested in a current tributary slot means whether the current tributary slot is divided into tributary slots of the another granularity, and a quantity of tributary slots of another granularity that are nested in the current tributary slot means a quantity of the tributary slots of the another granularity into which the current tributary slot is divided. Because the current tributary slot can be divided only into tributary slots of a smaller rate, the tributary slot of the another granularity mentioned herein may be generally referred to as the next-level tributary slot.

The client signal transmission method in FIG. 5 describes merely a solution for dividing one of the m first-granularity tributary slots into the n second-granularity tributary slots. It should be noted that, another first-granularity tributary slot of the m first-granularity tributary slots may further be divided into x third-granularity tributary slots based on at least one of a rate, a transmission distance, and a modulation format of a second client signal, where the rate of the first-granularity tributary slot is x times that of the third-granularity tributary slot, and x is a positive integer greater than 1. For example, in FIG. 6, a payload portion of an OPU2 signal is divided into first-granularity tributary slots TS a1, TS a2, TS a3, and TS a4. A rate of each first-granularity tributary slot is 2.5 G. One first-granularity tributary slot TS a1 is divided into second-granularity tributary slots TS b1, TS b2, and TS b3 based on a rate 0.8 G of a first client service signal. A rate of each second-granularity tributary slot is 0.833 G. One second-granularity tributary slot TS b1 may be used to carry the first client service signal. Herein, another first-granularity tributary slot TS a2 may also be divided into third-granularity tributary slots TS c1 and TS c2 based on a rate of a second client service signal, for example, when the rate of the second client service signal is 1.25 G. A rate of each third-granularity tributary slot is 1.25 G, and one third-granularity tributary slot TS c1 may be used to carry the second client service signal.

Figure 10:
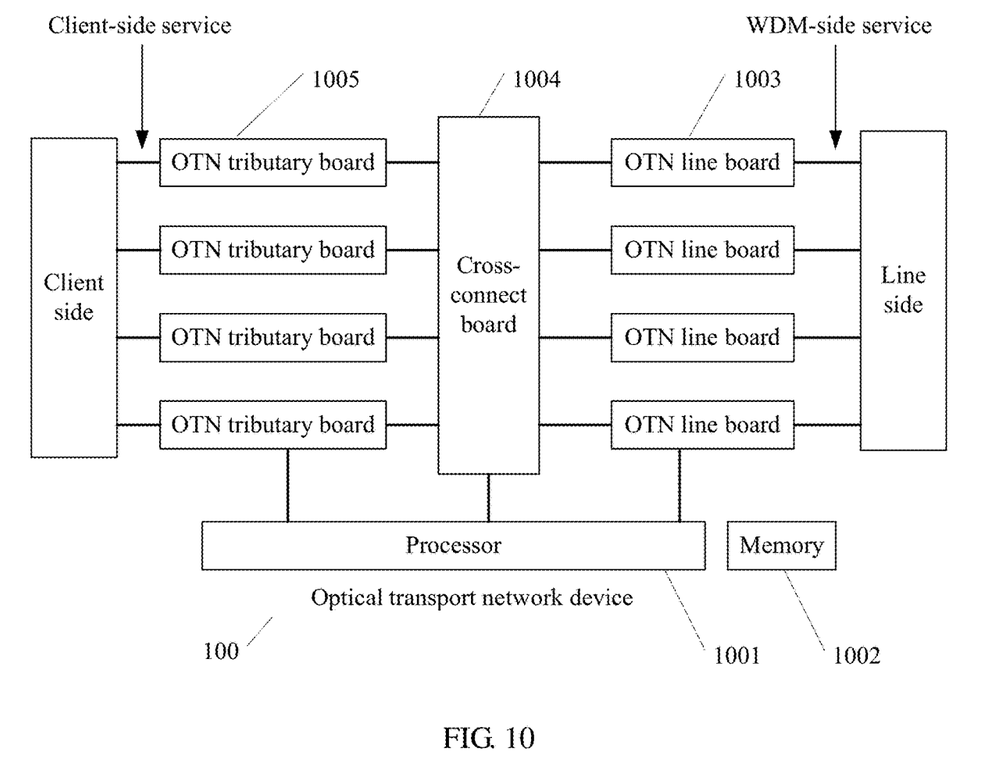
FIG. 10 is a schematic structural diagram of an optical transport network device according to an embodiment of the present invention.

FIG. 10 is a schematic structural diagram of an optical transport network device 100 according to an embodiment of the present invention. The optical transport network device 100 may include a processor (for example, a mainboard) 1001, a memory 1002, an OTN line board 1003, a cross-connect board 1004, and an OTN tributary board 1005. A transmission direction of a service may be from a client side to a line side, or may be from a line side to a client side. A service sent or received by the client side is referred to as a client-side service, and a service received or sent by the line side is referred to as a WDM-side service. Service processing procedures in the two directions are inverse processes.

The processor 1001 is connected by using a bus or directly to the memory 1002, the OTN line board 1003, the cross-connect board 1004, and the OTN tributary board 1005, and is configured to control and manage the OTN line board 1003, the cross-connect board 1004, and the OTN tributary board 1005.

The OTN tributary board 1005 is configured to complete encapsulation and mapping of a client signal (service signal). The client signal includes a plurality of service types, such as an Asynchronous Transfer Mode (ATM) service, an Synchronous Digital Hierarchy (SDH) service, an Ethernet service, a Common Public Radio Interface (CPRI) service, and a storage service. Specifically, the tributary board 1005 is configured to: receive a signal from the client side; encapsulate and map a received client signal to an Optical Channel Data Unit (ODU) signal; and add a corresponding OTN management and monitoring overhead. On the OTN tributary board 1005, the ODU signal may be a lower-order ODU signal, for example, an ODU 0, an ODU1, an ODU2, an ODU3, or an ODUflex. The OTN management and monitoring overhead may be an ODU overhead. Different types of client signals are encapsulated and mapped to different ODU signals in different manners.

The cross-connect board 1004 is configured to complete full cross-connection between the tributary board 1005 and the line board 1003, to implement flexible cross-connect scheduling of the ODU signal. Specifically, the cross-connect board 1004 can transmit an ODU signal from any tributary board to any line board, or transmit an OTU signal from any line board to any line board, or can transmit a client signal from any tributary board to any tributary board.

The OTN line board 1003 is configured to generate an OTU signal based on an ODU signal, and send the OTU signal to the line side. Before generating the OTU signal based on the ODU signal, the OTN line board 1003 may multiplex a plurality of lower-order ODU signals into a higher-order ODU signal; then add a corresponding OTN management and monitoring overhead to the higher-order ODU signal, to generate the OTU signal; and send the OTU signal to an optical transmission channel on the line side. On the OTN line board 1003, the higher-order ODU signal may be an ODU1, an ODU2, an ODU3, an ODU4, or the like. The OTN management and monitoring overhead may be an OTU overhead.

The processor 1001 performs interaction with the OTN tributary board 1005 and the OTN line board 1003, invokes a program in the memory 1002, and controls a transport device. For example, the processor 1001 controls one or more of the OTN tributary board 1005 and the OTN line board 1003 in the transport device to perform the following operations: dividing a payload of an OPU signal into m first-granularity tributary slots; dividing one of the m first-granularity tributary slots into n second-granularity tributary slots, where a rate of the first-granularity tributary slot is n times that of the second-granularity tributary slot, m is a positive integer, and n is a positive integer greater than 1; mapping a first client signal onto a payload in which one or more of the n second-granularity tributary slots are located; adding an overhead of the first-granularity tributary slot and an overhead of the second-granularity tributary slot for the OPU signal, to generate an ODU signal; and sending the ODU signal. Specifically, sending the ODU signal may be implemented by adding an OTU overhead for the ODU signal to generate an OTU signal and sending the OTU signal.

For an exemplary implementation of operations that are included above and performed by the foregoing processor, refer to corresponding steps performed by the optical transport network device in FIG. 5 and the corresponding embodiment. Details are not described again in this embodiment of the present invention.

Figure 11:
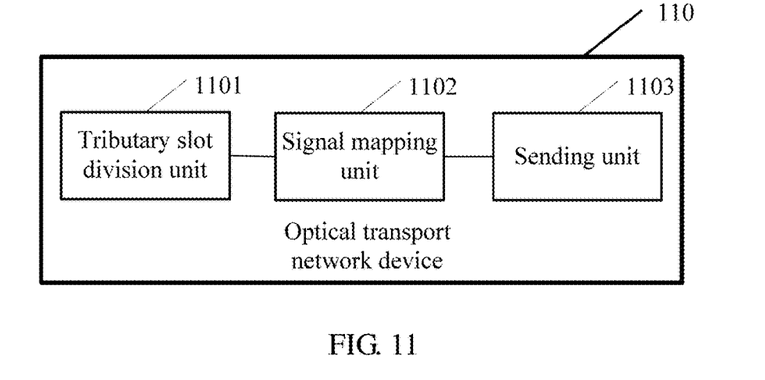
FIG. 11 is a schematic structural diagram of an optical transport network device according to an embodiment of the present invention.

FIG. 11 is a simplified functional block diagram of an optical transport network device 110 according to an embodiment of the present invention. The optical transport network device is configured to transmit a client signal. The optical transport network device 110 includes:

a tributary slot division unit 1101, configured to divide a payload of an optical payload unit signal into m first-granularity tributary slots, and divide one of the m first-granularity tributary slots into n second-granularity tributary slots, where a rate of the first-granularity tributary slot is n times that of the second-granularity tributary slot, m is a positive integer, and n is a positive integer greater than 1;

a signal mapping unit 1102, configured to map a first client signal onto a payload in which one or more of the n second-granularity tributary slots are located, and add an overhead of the first-granularity tributary slot and an overhead of the second-granularity tributary slot for the optical payload unit signal, to generate an optical data unit signal; and a sending unit 1103, configured to send the optical data unit signal.

Optionally, the tributary slot division unit 1101 is further configured to:

divide another first-granularity tributary slot of the m first-granularity tributary slots into x third-granularity tributary slots based on at least one of a rate, a transmission distance, and a modulation format of a received second client signal, where the rate of the first-granularity tributary slot is x times that of the third-granularity tributary slot, and x is a positive integer greater than 1.

Optionally, the signal mapping unit 1102 is further configured to:

map the second client signal onto a payload in which one or more of the x third-granularity tributary slots are located.

Optionally, the tributary slot division unit 1101 is further configured to: divide one of the x third-granularity tributary slots into z fourth-granularity tributary slots based on at least one of a rate, a transmission distance, and a modulation format of a third service signal; and the signal mapping unit 1102 is further configured to:

map the third service signal onto a payload in which one or more of the z fourth-granularity tributary slots are located, where z is a positive integer greater than 1, and the optical payload unit signal further includes an overhead of the fourth-granularity tributary slot.

For exemplary implementations of operations performed by units included in the foregoing optical transport network device, refer to steps performed by the optical transport network device in FIG. 5 and the corresponding embodiment. Details are not described again.

A person skilled in the art may clearly understand that technologies in embodiments of the present invention may be implemented by software and a general hardware platform. Based on such an understanding, technical solutions in embodiments of the present invention may be implemented in the form of a software product. The software product may be stored in a storage medium, such as a read-only memory (ROM) or a random access memory (RAM), a hard disk, or an optical disc, and include several instructions for instructing a computer device (which may be a personal computer, a server, a network device, or the like) to perform methods described in embodiments of the present invention.

The exemplary embodiments in the specification are described in a progressive manner, such that the description of parts for an exemplary embodiment may also be applicable to other exemplary embodiments.

The foregoing exemplary implementations of the present invention do not constitute any limitation on the protection scope of the present invention. Any modification, equivalent replacement, improvement, and the like made without departing from the spirit and principle of the present invention may fall within the protection scope of the present invention.

Additionally, statements made herein characterizing the invention refer to an embodiment of the invention and not necessarily all embodiments.

What is claimed is:

1. A method for transmitting a client signal in an optical transport network (OTN), wherein the method comprises:
    dividing, by an OTN device, a payload of an optical payload unit (OPU) signal into m first-granularity tributary slots;
    dividing, by the OTN device, one of the m first-granularity tributary slots into n second-granularity tributary slots, wherein a rate of the first-granularity tributary slot is n times that of a second-granularity tributary slot of the n second-granularity tributary slots, m is a positive integer greater than 1, and n is a positive integer greater than 1;
    dividing, by the OTN device, another first-granularity tributary slot of the m first-granularity tributary slots into x third-granularity tributary slots, wherein the rate of the first-granularity tributary slot is x times that of a third-granularity tributary slot of the x third-granularity tributary slots, and x is a positive integer greater than 1;
    generating, by the OTN device, an optical data unit (ODU) signal, wherein generating the ODU signal comprises:
        mapping a first client signal onto a payload in which one or more of the n second-granularity tributary slots are located; and
        adding an overhead of a first-granularity tributary slot of the m first-granularity tributary slots and an overhead of the second-granularity tributary slot for the OPU signal, wherein the overhead of the first-granularity tributary slot is located in an OPU signal overhead of the OPU signal, and wherein the overhead of the second-granularity tributary slot is located in a payload of the OPU signal; and
    sending, by the OTN device, the ODU signal.

2. The method according to claim 1, wherein a value of n is determined based on a rate, a transmission distance, and/or a modulation format of the first client signal.

3. The method according to claim 1, wherein the ODU signal further comprises an overhead of the third-granularity tributary slot;
    wherein dividing the another first-granularity tributary slot of the m first-granularity tributary slots into x third-granularity tributary slots comprises: dividing the another first-granularity tributary slot of the m first-granularity tributary slots into the x third-granularity tributary slots based on a rate, a transmission distance, and/or a modulation format of a received second client signal; and
    wherein the method further comprises: mapping the second client signal onto a payload in which one or more of the x third-granularity tributary slots are located.

4. The method according to claim 1, wherein the method further comprises:
    dividing one of the x third-granularity tributary slots into z fourth-granularity tributary slots based on a rate, a transmission distance, and/or a modulation format of a third service signal; and
    mapping the third service signal onto a payload in which one or more of the z fourth-granularity tributary slots are located;
    wherein z is a positive integer greater than 1, and the OPU signal further comprises an overhead of a fourth-granularity tributary slot of the z fourth-granularity tributary slots.

5. The method according to claim 1, wherein the overhead of the first-granularity tributary slot is located in a Multiplex Structure Identifier (MSI) field of the overhead of the OPU signal, and the overhead of the first-granularity tributary slot is used to identify the first-granularity tributary slot.

6. The method according to claim 5, wherein the overhead of the first-granularity tributary slot further comprises information used to indicate whether the first-granularity tributary slot is divided into tributary slots of another granularity.

7. The method according to claim 6, wherein when the overhead of the first-granularity tributary slot indicates that the first-granularity tributary slot is divided into tributary slots of another granularity, the overhead of the first-granularity tributary slot further comprises information indicating a quantity of tributary slots of the another granularity into which the first-granularity tributary slot is divided.

8. The method according to claim 1, wherein the method further comprises:
    mapping a fifth client signal onto one or more first-granularity tributary slots of the m first-granularity tributary slots other than the first-granularity tributary slot that is divided into the n second-granularity tributary slots.

9. The method according to claim 1, wherein dividing the payload of the OPU signal into m first-granularity tributary slots comprises:
    sequentially numbering all columns of columns 1 to 3808 in the payload of the OPU signal from 1 to m in a cyclic manner, wherein columns having the same number belong to the same first-granularity tributary slot.

10. The method according to claim 1, wherein dividing the payload of the OPU signal into m first-granularity tributary slots comprises:
    sequentially numbering every M bytes in columns 1 to 3808 in the payload of the OPU signal from 1 to m in a cyclic manner, wherein bytes having the same number belong to the same first-granularity tributary slot, and M is a positive integer.

11. An optical transport network (OTN) device, comprising at least one processor and a memory having processor-executable instructions stored thereon, wherein the processor-executable instructions, when executed by the at least one processor, facilitate:
   dividing a payload of an optical payload unit (OPU) signal into m first-granularity tributary slots;
   dividing one of the m first-granularity tributary slots into n second-granularity tributary slots, wherein a rate of the first-granularity tributary slot is n times that of a second-granularity tributary slot of the n second-granularity tributary slots, m is a positive integer greater than 1, and n is a positive integer greater than 1;
   dividing another first-granularity tributary slot of the m first-granularity tributary slots into x third-granularity tributary slots, wherein the rate of the first-granularity tributary slot is x times that of a third-granularity tributary slot of the x third-granularity tributary slots, and x is a positive integer greater than 1;
   generating an optical data unit (ODU) signal, wherein generating the ODU signal comprises mapping a first client signal onto a payload in which one or more of the n second-granularity tributary slots are located and adding an overhead of a first-granularity tributary slot of the m first-granularity tributary slots and an overhead of the second-granularity tributary slot for the OPU signal, wherein the overhead of the first-granularity tributary slot is located in an OPU signal overhead of the OPU signal, and wherein the overhead of the second-granularity tributary slot is located in a payload of the OPU signal; and
   sending the ODU signal.

12. The device according to claim 11, wherein dividing the another first-granularity tributary slot of the m first-granularity tributary slots into x third-granularity tributary slots comprises:
   dividing the another first-granularity tributary slot of the m first-granularity tributary slots into x third-granularity tributary slots based on a rate, a transmission distance, and/or a modulation format of a received second client signal, wherein the rate of the first-granularity tributary slot is x times that of a third-granularity tributary slot of the x third-granularity tributary slots, and x is a positive integer greater than 1.

13. The device according to claim 12, wherein the processor-executable instructions, when executed, further facilitate:
   mapping the second client signal onto a payload in which one or more of the x third-granularity tributary slots are located.

14. The device according to claim 12, wherein processor-executable instructions, when executed, further facilitate:
   dividing one of the x third-granularity tributary slots into z fourth-granularity tributary slots based on a rate, a transmission distance, and/or a modulation format of a third service signal; and
   mapping the third service signal onto a payload in which one or more of the z fourth-granularity tributary slots are located;
   wherein z is a positive integer greater than 1, and the OPU signal further comprises an overhead of a fourth-granularity tributary slot of the z fourth-granularity tributary slots.

15. The device according to claim 11, wherein the overhead of the first-granularity tributary slot is located in a Multiplex Structure Identifier (MSI) field of an overhead of the OPU signal, and the overhead of the first-granularity tributary slot is for identifying the first-granularity tributary slot.

16. The device according to claim 15, wherein the overhead of the first-granularity tributary slot further comprises information for indicating whether the first-granularity tributary slot is divided into tributary slots of another granularity.

* * * * *